(12) United States Patent
Yang et al.

(10) Patent No.: US 8,472,312 B1
(45) Date of Patent: Jun. 25, 2013

(54) STACKED NETWORK SWITCH USING RESILIENT PACKET RING COMMUNICATION PROTOCOL

(75) Inventors: Brian Hang Wai Yang, Monterey Park, CA (US); Ken K. Ho, San Jose, CA (US); Aamer Latif, Milpitas, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 38 days.

(21) Appl. No.: 12/567,595

(22) Filed: Sep. 25, 2009

Related U.S. Application Data

(63) Continuation of application No. 10/826,215, filed on Apr. 16, 2004, now Pat. No. 7,613,201.

(60) Provisional application No. 60/463,992, filed on Apr. 18, 2003.

(51) Int. Cl.
*G01R 31/08* (2006.01)
*G06F 11/00* (2006.01)
*G06F 15/16* (2006.01)
*H04J 1/16* (2006.01)
*H04L 12/26* (2006.01)

(52) U.S. Cl.
USPC ........... 370/219; 370/220; 370/222; 370/236; 370/237; 709/209; 709/234; 709/235

(58) Field of Classification Search
USPC .. 370/219, 220, 222, 236, 237; 709/208–211, 709/234, 235
See application file for complete search history.

(56) References Cited

U.S. PATENT DOCUMENTS

| | | | |
|---|---|---|---|
| 4,893,305 A * | 1/1990 | Fernandez et al. | 370/254 |
| 5,491,687 A | 2/1996 | Christensen et al. | |
| 6,246,692 B1 | 6/2001 | Dai et al. | |
| 6,687,751 B1 * | 2/2004 | Wils et al. | 709/230 |
| 6,697,360 B1 * | 2/2004 | Gai et al. | 370/389 |
| 6,785,272 B1 * | 8/2004 | Sugihara | 370/386 |
| 7,054,264 B2 | 5/2006 | Mor | |
| 7,110,355 B1 | 9/2006 | Oz et al. | |
| 7,274,694 B1 * | 9/2007 | Cheng et al. | 370/389 |
| 7,580,349 B1 * | 8/2009 | Wang et al. | 370/230 |
| 7,613,201 B1 | 11/2009 | Yang et al. | 370/437 |
| 2002/0110148 A1 * | 8/2002 | Hickman et al. | 370/475 |
| 2002/0186667 A1 | 12/2002 | Mor et al. | |
| 2003/0009599 A1 | 1/2003 | Lee et al. | |
| 2003/0074469 A1 * | 4/2003 | Busi et al. | 709/238 |
| 2003/0147385 A1 * | 8/2003 | Montalvo et al. | 370/389 |
| 2004/0049564 A1 | 3/2004 | Ng et al. | |
| 2004/0133619 A1 * | 7/2004 | Zelig et al. | 709/200 |

\* cited by examiner

*Primary Examiner* — Un C Cho
*Assistant Examiner* — Jeremy Costin
(74) *Attorney, Agent, or Firm* — Sterne, Kessler, Goldstein & Fox PLLC

(57) ABSTRACT

A stacked switch using a resilient packet ring protocol comprises a plurality of switch modules coupled to one another in a ring topology and each having a plurality of external terminals for interfacing with external devices. Each switch module includes an external interface for communicating with the external terminals, the external interface configured to communicate using a communication protocol; and an internal interface for communicating with other switches, the internal interface using a resilient packet ring (RPR) protocol. Advantages of the invention include the ability to flexibly create a high performance stacked switch with advanced features.

18 Claims, 7 Drawing Sheets

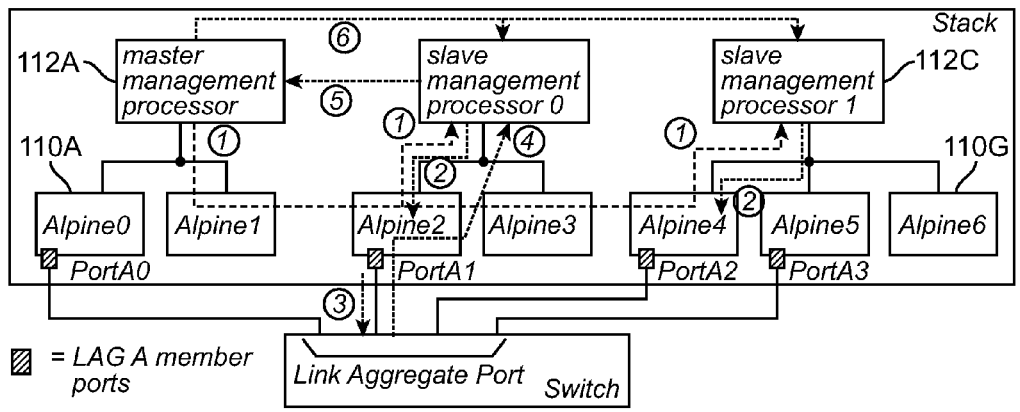

Move conversation B from portA1 to portA2:
1. MMP send req to SMP's to send marker PDU frame to portA1, discard incoming conversationB traffic
2. SMP0 send marker PDU to PortA1, SMP's change LAG map at Alpine0,2,4,5 to discard conversationB traffic
3. Alpine2 send out marker PDU frame to remote switch through PortA1
4. Alpine2 receive marker response PDU frame from portA1 and notify SMP0
5. SMP0 notify MMP about reception of marker response PDU
6. MMP notify SMP's to update LAG map in all Alpines to transmit conversation to PortA2 => conversation move complete

FIG. 7

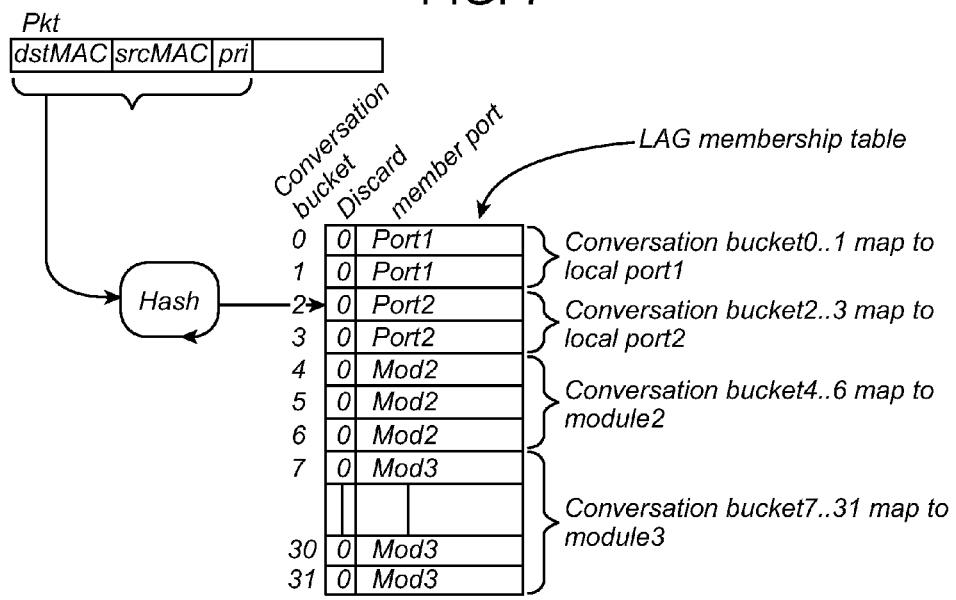

If among of traffic are same for each conversation bucket are equal then the traffic distribution will be:
Port1: will transmit 2/32 of total LAG traffic
Port2: will transmit 2/32 of total LAG traffic
module2: will transmit 3/32 of total LAG traffic
Module3: will transmit 25/32 of total LAG traffic

FIG. 8 ial application filed Apr. 18, 2003 under Ser. No. 60/463,992, both of which incorporated herein by reference.

STACKED NETWORK SWITCH USING RESILIENT PACKET RING COMMUNICATION PROTOCOL

REFERENCE TO RELATED APPLICATIONS

The present application is a continuation of an application filed Apr. 16, 2004 now U.S. Pat. No. 7,613,201 under Ser. No. 10/826,215, which, in turn, claims priority to a provisional application filed Apr. 18, 2003 under Ser. No. 60/463,992, both of which incorporated herein by reference.

FIELD

The present invention relates to the field of telecommunications, and more particularly to a stacked network switch using resilient packet ring communication protocol.

BACKGROUND

Digital broadband networking and communications products and services are the infrastructure over which the Internet operates. The universal benefits of the Internet are well known, enabling immediate worldwide sharing of news and events, access to in-depth research on virtually any topic, sophisticated financial analysis available to all, the convenience of e-commerce available on virtually any product to consumers and the emerging capabilities for commercial e-commerce, and the outsourcing enabled by Application Service Providers and Storage Area Networks, to list just a few of the world-changing available uses.

This explosive growth in network traffic is further demonstrated by forecasts made by many leading networking industry experts regarding scaling specific infrastructure areas. Every aspect of these scaling estimates represents requirements for network equipment to scale to provide the necessary bandwidth.

Telecommunications switches help to meet the needs of many devices to connect to a network and then for the network to communicate with other networks. However, often there is a need for many ports (e.g. 128), which can exceed the number of ports in a standard switch (e.g. 32). In these cases, network engineers typically construct a stacked switch consisting of many interconnected switches. The simplest stacked switch simply connects an available port in one switch with an available port in another switch and utilizes a standard protocol between the two in order to route the telecommunications traffic. A problem with this simple implementation is that the interconnected ports are no faster than the other ports (e.g. 10/100).

One improved technique of creating a stacked switch provides a proprietary high-speed interconnect between switches. This technique is an improvement because it provides for much faster traffic between the switches. However, a proprietary protocol does not support flexibility of stacked switch design and construction. It also may not support fault tolerance or other advanced features that would be desirable in a stacked switch.

What is needed is a stacked switch that uses a high-speed open standard communication protocol between the switches, and which has the ability to provide advanced features such as fault tolerance and communication port handover.

SUMMARY OF INVENTION

A stacked switch using a resilient packet ring protocol comprises a plurality of switch modules coupled to one another in a ring topology and each having a plurality of external terminals for interfacing with external devices. Each switch module includes an external interface for communicating with the external terminals, the external interface configured to communicate using a communication protocol (e.g. Ethernet protocol); and an internal interface for communicating with other switches, the internal interface using a resilient packet ring (RPR) protocol.

In one embodiment, each switch module further includes a controller coupled to the external interface and the internal interface and configured to selectively communicate information between the external interface and the internal interface.

In another embodiment, the stacked switch further comprises (a) a master management processor coupled to one or more switch modules and configured to provide instructions regarding the communication of information between each switches' external interface and internal interface, and to control data flow; and (b) a slave management processor coupled to the master management processor through at least one switch and one or more switch modules and configured to provide instructions regarding the communication of information between each switches' external interface and internal interface, and to control data flow. In one aspect of the invention, the processors assign their master/slave relationships based on some predetermined criteria and can re-assign the relationships based on fault conditions.

In one aspect of the invention, the stacked switch further comprises a link aggregation port coupled to at least two switch modules' external terminals and configured to selectively aggregate information to and from the switch modules.

Advantages of the invention include the ability to flexibly create a high performance stacked switch with advanced features.

BRIEF DESCRIPTION OF THE FIGURES

The present invention is illustrated by way of example, and not by way of limitation, in the figures of the accompanying drawings and in which like reference numerals refer to similar elements and in which:

FIG. 7 depicts a technique for sending a marker to facilitate handover from one port to another port according to an embodiment of the invention;

FIG. 8 depicts a technique for load balancing in a LAG configuration according to an embodiment of the invention.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol and Resilient Packet Ring (RPR) Protocol but other protocols can be used in the invention.

Glossary

Stack: a set of switch chips (modules) connected by stacking links (e.g. RPR ring)

Module: a switch chip

Management processor: a processor handling the management layer function for a group of one or many modules; there are multiple management processors in a stack, one of them is master, others slaves Routing processor: a processor handling the L3 routing and forwarding function for a group of one or many modules; there are multiple routing processors in a stack, one of them is master, others slaves LAG: Link Aggregation Group MMP: Master Management Processor SMP: Slave Management Processor MRP: Master Routing Processor SRP: Slave Routing Processor RPR: Resilient Packet Ring 10 GE: 10 Gigabit Ethernet

A. ARCHITECTURE

A definition of stacking in the context of the invention is to couple multiple individual switches together as a group to create a combination switch. In this context, a group of modules 11A-11D can be coupled, for example, though an RPR ring in a ring configuration or 10 GE links in a star configuration.

Figure 1:
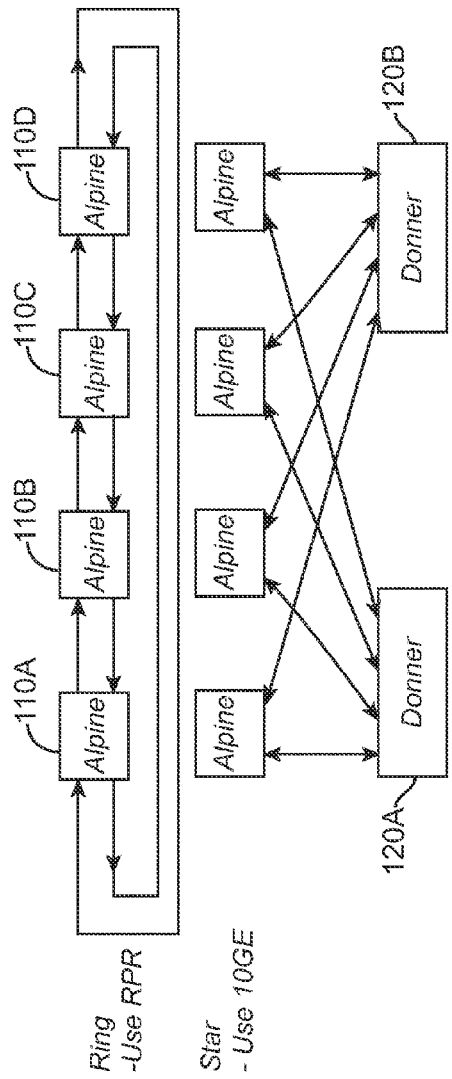
FIG. 1 depicts a ring-type and star-type stacked switch architectures for coupling the switch modules.

FIG. 1 depicts a ring-type and star-type stacked switch architectures comprising a number of modules 110A-110D, for example. The preferred architecture for the invention is a ring-type architecture, but other architectures can be implemented. The stacked switch is constructed from a number of switch modules (switch modules are labeled as Alpine) that are linked to one another and appear as a single L2 or L3 (level 2 or level 3) switch. The connection between the switches is via 10 GE links or RPR ring, but the group is managed as a single switch. In the case that the switch appears as a single L3 switch, it may still have multiple Internet Protocol (IP) addresses. The stacked switch supports link aggregation among ports that belong to the same or different modules in the stack. The invention also supports mirroring among ports belong to same or different modules in the stack.

The ring architecture uses RPR as follows. The ring employs the resiliency mechanism defined in the RPR standard. Consequently, the invention doesn't need extra switch/fabric chips for stacking. However, in some cases, the ring can have a scalability issue since the ring may become a bottle neck (RPR ring only provide total 20 G duplex bandwidth share by all Alpines, no matter how many Alpines in a stack).

The star architecture uses a 10 Gigabit Ethernet connection. In this case, the resiliency is achieve by redundant connections, and is less sophisticated than RPR. The switch may need extra switch/fabric chips for stacking connections. However, this architecture may scale better depending on the application and throughput requirements.

In the L2 scheme, there is no visibility of ports in other modules, L2 learning base on srcPortID (of own module) just like non-stacking case; both Ingress Alpine and egress Alpine need to perform L2 look up. (Adv: No special case, stacking traffic or not. No special encapsulation on stacking traffic. Disadv: high bandwidth requirement on L2 lookup/forwarding which is required anyway since need to support stand-alone 10 GE interface)

B. STACKED SWITCH RING

Figure 2:
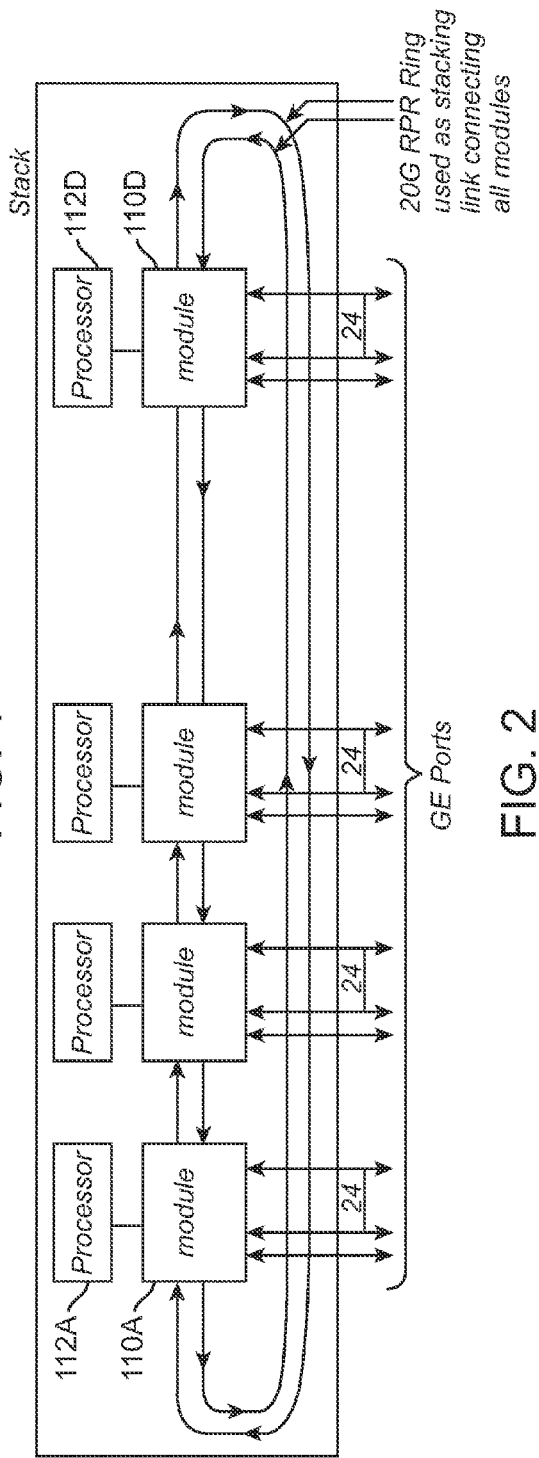
FIG. 2 depicts a stacked switch using RPR according to an embodiment of the invention.
Figure 3:
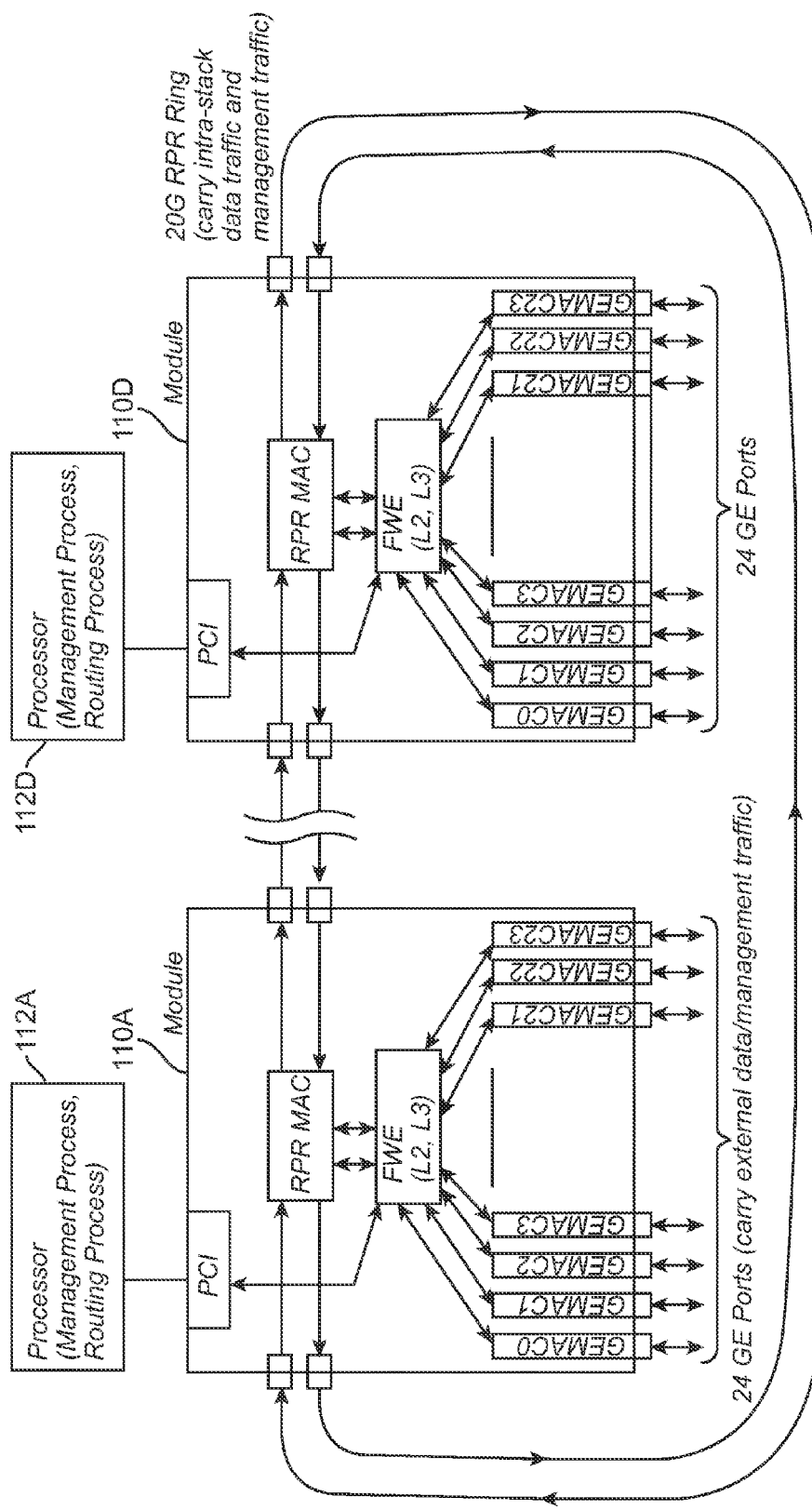
FIG. 3 depicts a detailed view of FIG. 2 showing the internal components of a stacked switch module according to an embodiment of the invention.

FIGS. 2 and 3 depict a stacked switch using RPR according to an embodiment of the invention. The modules 110A-110D are coupled to one another with a dual RPR ring, where a first ring employs clockwise communication and a second ring employs counter-clockwise communication. This dual-ring architecture improves performance and fault tolerance. FIG. 3 depicts a detailed view of the switch modules including the internal RPR MAC (media access controller) and other components that facilitate the management and switching functions of the invention.

A management processor is coupled to each of the modules as a management controller. The processor controls functions such as various management tasks and routing processes. The management processor handles the management layer function for a group of one or many modules. In a stacked switch, there are multiple management processors, where one of them is the master (MMP) and the others are slaves (SMP). A routing processor is one that handles the L3 routing and forwarding function for a group of one or many modules. In a stacked switch, there are multiple routing processors, where one of them is the master (MRP) and the others are slaves (SRP).

Figure 4:
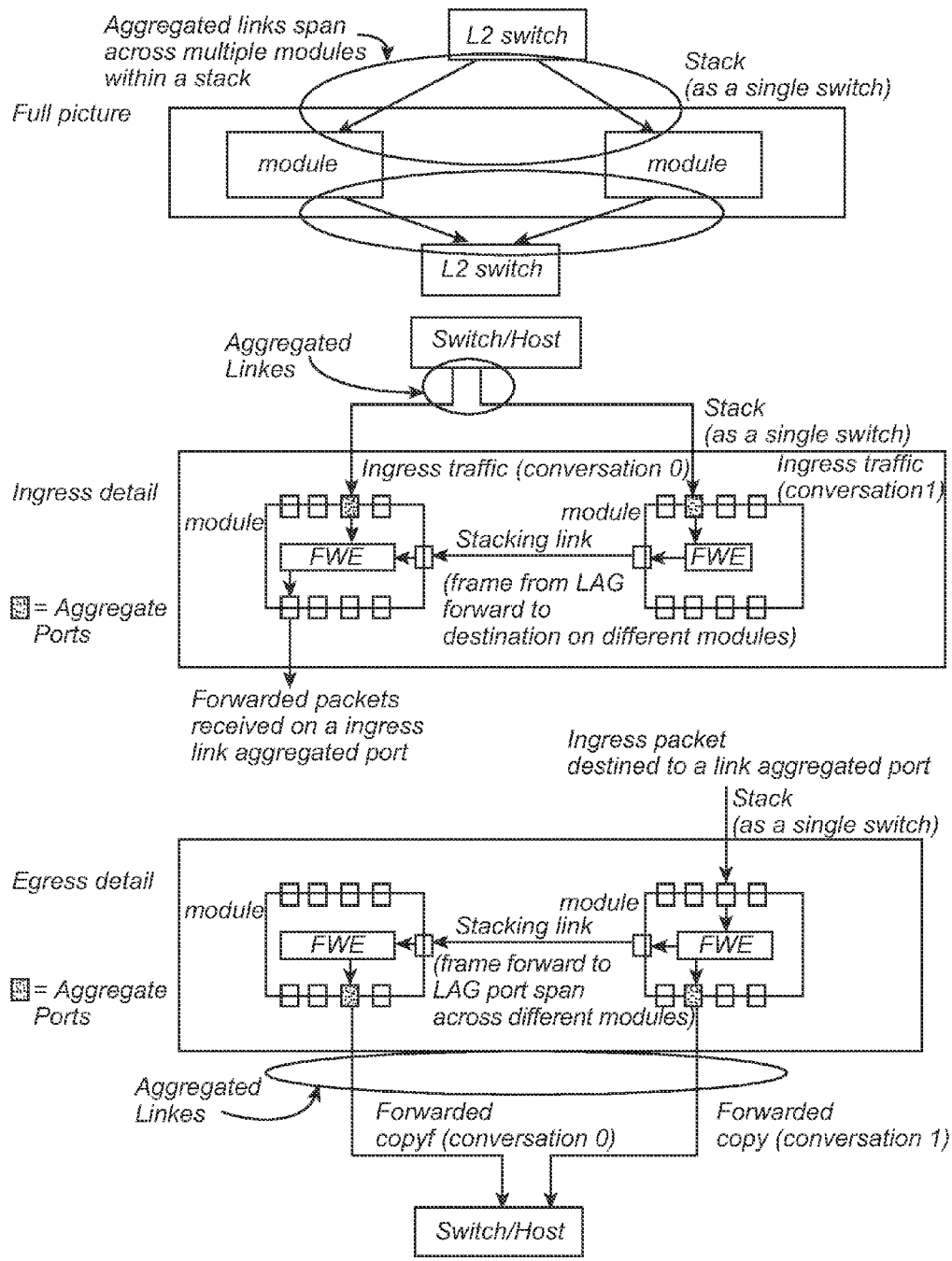
FIG. 4 depicts link aggregation trunking over an RPR stack according to an embodiment of the invention.

FIG. 4 depicts link aggregation trunking over an RPR stack according to an embodiment of the invention. The Link aggregation is designed to support an external device that coupled to one or more stacked switch port. In one aspect of the invention, local ports on a switch are aggregated. In another aspect of the invention, ports on different switched are aggregated and an external device couples to one port on one module and another port on another module. The invention has the management function to handle an aggregated link across modules.

Figure 5:
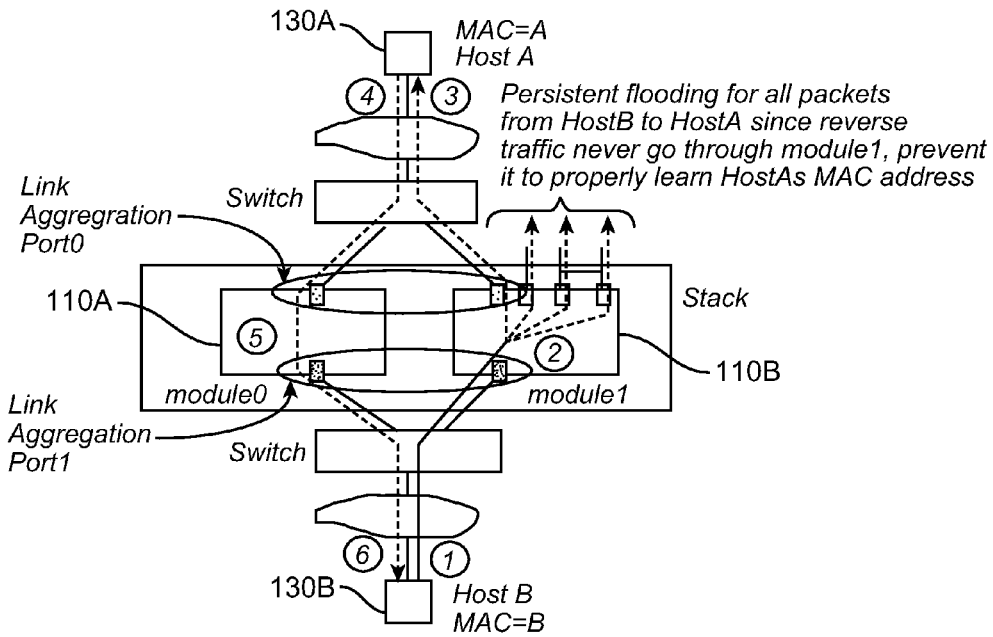
FIG. 5 depicts an exemplary persistent flooding problem in link aggregation across multiple modules.

FIG. 5 depicts an exemplary persistent flooding problem in link aggregation across multiple modules. There is persistent flooding for all packets from HostB 130B to HostA 130A since reverse traffic never goes through module 110B, preventing it from properly learning HostA's MAC address. An example of persistent flooding problem can occur across multiple modules. The following is an example.

1. HostB with MAC==B send a packet, PKT0 (srcMAC=B, destMAC=A) to HostA with MAC==B; the interconnection path between HostA and HostB traversed across a pair of aggregated links in a Stack.
2. PKT0 entered module1 through West link of LAG1; assume destMAC==A had never been learnt in module1 before, so PKT0 will be flooded to all ports including LAG0 West link to eventually reach HostA.
3. PKT0 reached HostA.
4. HostA generated a reverse directed packet, PKT1 (srcMAC==A, destMAC==B) back to HostB.
5. PKT1 entered module0 through East link of LAG0; if destMAC==B had been learnt by module0 before then PKT1 will not be flooded but forwarded to LAG1 East link to reach HostB.
6. PKT1 reached HostB.

Since PKT1 was not being flooded to module1, the MAC address A will never be learnt by module 11. Subsequent traffic from HostB to HostA will persistently be flooded by module1. To solve this problem, when module0 learn MAC A from an ingress packet entering a Link Aggregation Port, it communicate this learning to other modules so that they can be forced to learn that MAC address as well. This is achieved by software initiated intra-stack management frames.

Figure 6:
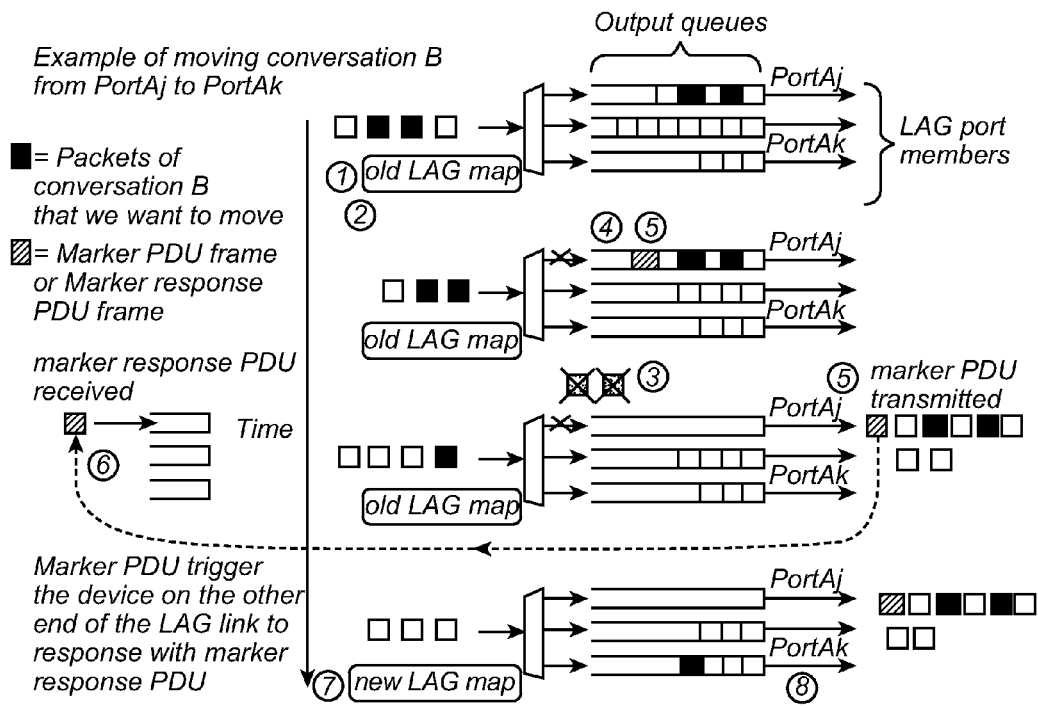
FIG. 6 depicts an exemplary conversation handover from one port to another port according to an embodiment of the invention.

FIG. 6 depicts an exemplary conversation handover from one port to another port in a Link Aggregation Group (LAG) configuration according to an embodiment of the invention. FIG. 7 depicts a technique for sending a marker to facilitate handover from one port to another port according to an embodiment of the invention.

The invention employs a marker technique for preventing an out-of-order problem when handing over traffic from one port to another. To prevent an out-of-order problem, the link aggregation standard requires that the same conversation, for example, (3-tuple: {srcMAC, destMAC, QOS}) must be consistently transmitted through the same port/link in a LAG. During update of LAG configuration, one conversation can be switch from one physical port to the other within the same LAG. However, if there is conversation traffic during the re-configuration, an out-of-order condition may occur if not handled properly. The invention employs a marker frame scheme is used to solve this problem. There are two favors of the marker frame scheme (IEEE Scheme for single-module LAG and RMI extension for multi-module LAG).

1. Assume a particular LAG A with members {portA0, portA1, . . . , portAn}.
2. Assume to move conversation bucket B from portAj to portAk.
3. Master processor command all slaves to update LAG A table in all modules to discard further incoming conversation bucket B packets.
4. Start timer (for timeout).
5. Send a marker PDU frame to output queue of portAj. (which should trigger the other end of the link aggregation link to response with a marker response PDU frame). Since each output queues consists of 8 priorities, we need a special procedure to send marker PDU frame.
6. Wait for either marker response PDU from portAj or time-out timer expire (this ensure all the conversation B traffic had been received by the other end).
7. Master processor command all slaves to update LAG A table in all modules to map conversation bucket B to portAk. (so that subsequent conversation B traffic will be transmitted to portAk) and stop discard of conversation bucket B traffic.
8. Conversation B traffic start transmit from portAk.

An exemplary LAG handover to move a conversation B from portA1 to portA2 is shown in FIG. 7 by following the numbered arrows as follows.

1. MMP sends a request to SMPs to send a marker PDU frame to portA1, to discard incoming conversation B traffic.
2. SMP0 sends a marker PDU to portA1, SMPs change the LAG map at modules 0, 2, 4, and 5 to discard conversation B traffic.
3. Module 2 sends out a marker PDU frame to remote switch through portA1.
4. Module 2 receives a marker response PDU frame from portA1 and notifies SMP0.
5. SMP0 notifies MMP about reception of the marker response PDU.
6. MMP notifies SMPs to update the LAG map in all modules to transmit conversation to portA2.
7. The conversation handover is complete.

FIG. 8 depicts a technique for load balancing among LAG links in a LAG configuration according to an embodiment of the invention. The following is an example of how to perform this function.

1. Traffic destined to a LAG is analyzed and then dynamically mapped (hashed) into conversation buckets (e.g. 32) from n-tuple, for example 3-tuple ({destMAC, srcMAC, priority}). The value of n and the form of information from the packet header depends on available space on an exemplary integrated circuit.
2. Each conversation bucket is then mapped into a number of physical output ports (e.g. 1 of up to 8) by LAG membership table.
3. Load balance is achieved by programming the LAG table in such a way that the among traffic (of one or many conversation buckets) to each port are more or less balanced.
4. In one aspect, the invention provides statistics based on LAG port on a per conversation bucket per port basis so that the software knows how much traffic a conversation bucket contains and can dynamically assign/move conversation buckets based on packet characteristics.
5. In one aspect, load balancing is preferably on a conversation bucket granularity (more number of conversation bucket, finer the granularity), it is possible that majority of the traffic may belong to a single conversation bucket and thus prevent the conversations from being properly load balanced without modifying the hashing algorithm.
6. In one aspect, the invention includes synchronization.
7. In one aspect, a marker is selectively added to the data stream to provide a guide for the switching.

As described above, the invention can provide statistics based on LAG port traffic. The processors 112A-112D can use this information to selectively allocate port resources and create or delete link aggregation configurations. Also, as described above, the statistics can be used for load balancing purposes to aid the processors in their algorithmic decisions to selectively allocate port resources and create or delete link aggregation configurations.

Figure 9:
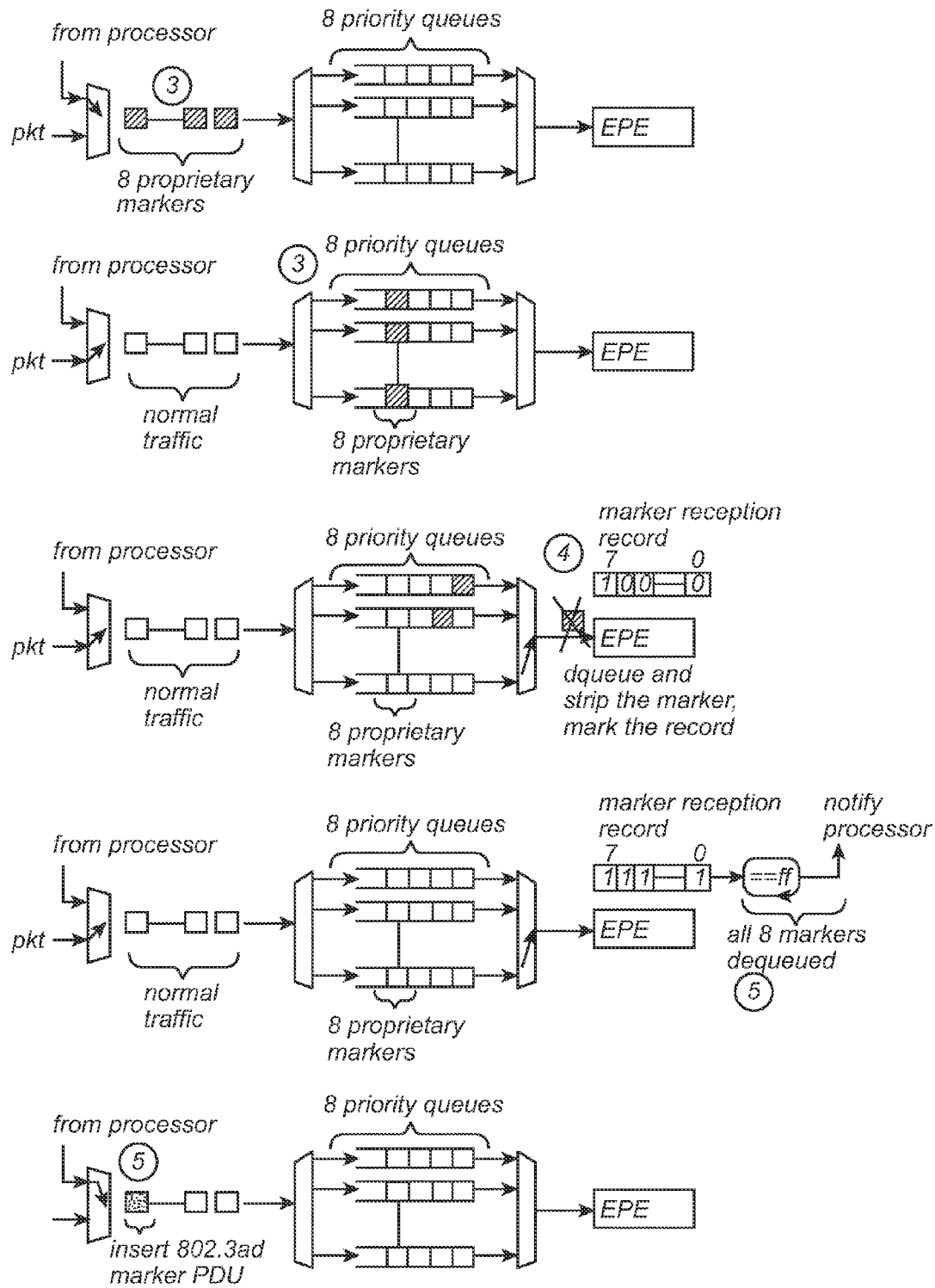
FIG. 9 depicts a procedure for sending a marker PDU frame according to an embodiment of the invention.
Figure 9:
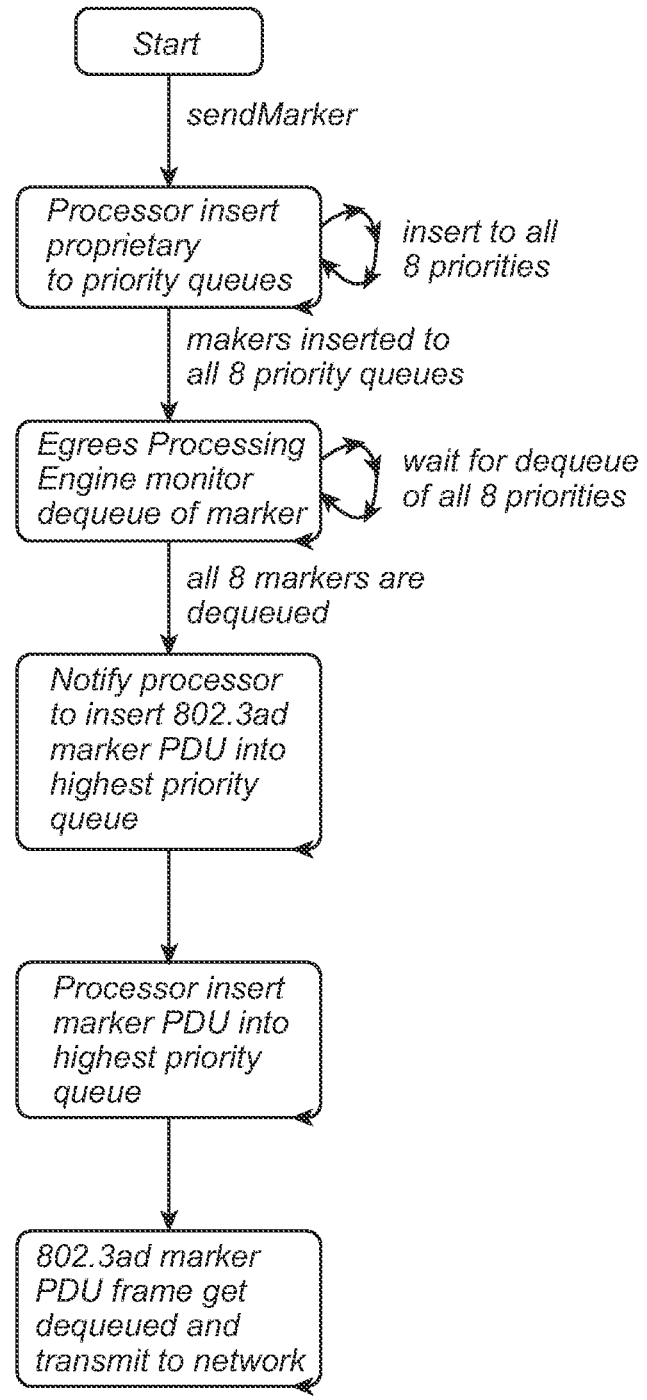

FIG. 9 depicts a procedure for sending a marker PDU frame according to an embodiment of the invention. The following is an example of how to perform this function.

1. Each exemplary output queue consists of 8 priority queues.
2. Desire to ensure all 8 queues are flushed, hence need 8 marker frames instead.
3. The CPU inserts 8 proprietary marker frames, one on each of the 8 priority queues.
4. The Egress processing engine (EPE) monitors dequeue of these proprietary marker frames and makes a record, but strip them from the datapath, (preventing the marker frames from being transmitted into network).
5. When the EPE is detected that all the 8 markers had been dequeued, that means traffic from all the 8 queues has been transmitted, the EPE then notifies the processor to insert the real 802.3ad marker PDU frame into the highest priority queue, this marker frame will then be dequeued and transmitted to the remote switch/host.

C. CONCLUSION

Advantages of the invention include the ability to flexibly create a high performance stacked switch with advanced features.

Having disclosed exemplary embodiments and the best mode, modifications and variations may be made to the disclosed embodiments while remaining within the subject and spirit of the invention as defined by the following claims.

We claim:

1. A stacked switch using a resilient packet ring protocol comprising:
   a plurality of switch modules coupled together, and a switch module of the plurality of switch modules having a plurality of external terminals to interface with one or more external devices, where the switch module includes:
      an external interface to communicate via the plurality of external terminals using a communication protocol; and
      an internal interface to communicate with one or more other switch modules of the plurality of switch modules;
   a master processor, coupled to one or more of the plurality of switch modules, to provide instructions regarding communication of information between the external interface and the internal interface of the switch module and to control data flow, the master processor being configured to introduce first marker information and second marker information into the data flow to facilitate a handover between a plurality of ports, wherein the first marker information includes a plurality of marker frames, each of the plurality of marker frames being provided to a corresponding one of the plurality of ports, and wherein each of the plurality of ports have an associated priority level, and the second marker information includes a protocol data unit (PDU) marker frame, the PDU marker frame being provided to a port of the plurality of ports having a highest priority level of the associated priority levels;
   a slave processor, coupled to the master processor through one or more switch modules under a master-slave relationship, to implement the instructions from the master processor; and
   a link aggregation port that is controlled by the master processor or the slave processor to aggregate at least some of the plurality of switch modules based at least in part upon statistics associated with at least a part of the data flow.

2. The stacked switch of claim 1, wherein statistics are to be evaluated to generate a link signal representative of the at least some of the plurality of switch modules to be aggregated.

3. The stacked switch of claim 1, wherein the switch module further includes a controller, coupled to the external interface and the internal interface, to selectively communicate information between the external interface and the internal interface.

4. The stacked switch of claim 1, wherein the link aggregation port is configured to respond to a link signal and to dynamically set one or more external terminals of the plurality of external terminals to selectively aggregate information to and from the at least some of the plurality of switch modules.

5. The stacked switch of claim 1, wherein
   the master processor is configured to assign the master-slave relationship based at least in part on one or more predetermined criteria or a fault condition; and
   the slave processor is configured to become another master processor if the master processor fails.

6. The stacked switch of claim 4, wherein the link aggregation port is configured coupled to the plurality of external terminals of one or more switch modules and is to selectively aggregate the information to and from the at least some of the plurality of switch modules.

7. The stacked switch of claim 2, further comprising:
   a memory to store the statistics through the switch module, wherein the master processor is configured to evaluate the statistics in the memory and to generate the link signal.

8. The stacked switch of claim 1, wherein the introduction of the first and second marker information ensures that integrity of the data flow is maintained when a link aggregation for the at least some of the plurality of switch modules is modified.

9. A method of switching data through a stacked switch, the method comprising:
   storing statistics associated with a communication of data through at least one switch module of a plurality of switch modules in the stacked switch;
   providing instructions regarding communication of information between an external interface and an internal interface of the at least one switch module of the plurality of switch modules, controlling data flow, and introducing first marker information and second marker information into the data flow to facilitate a handover between a plurality of ports by using at least a master processor that is coupled to one or more of the plurality of switch modules, wherein the first marker information includes a plurality of marker frames, each of the plurality of marker frames being provided to a corresponding one of the plurality of ports; and wherein each of the plurality of ports have an associated priority level, and the second marker information includes a protocol data unit (PDU) marker frame, the PDU marker frame being provided to a port of the plurality of ports having a highest priority level of the associated priority levels following removal of the plurality of marker frames from the data flow;
   implementing the instructions provided by the master processor by using a slave processor that is coupled to the master processor through one or more of the plurality of switch modules under a master-slave relationship; and
   controlling the data flow by aggregating at least some of the plurality of switch modules by using a link aggregation port controlled by the master processor or the slave processor to aggregate the at least some of the plurality of switch modules based at least in part upon statistics associated with at least a part of the data flow.

10. The method of claim 9, further comprising evaluating the statistics to generate a link signal representative of the at least some of the plurality of switch modules to be aggregated.

11. The method of claim 10, further comprising selectively activating the link aggregation port to respond to the link signal and to dynamically set one or more external terminals of the at least some of the plurality of switch modules to selectively aggregate information to and from the at least some of the plurality of switch modules.

12. The method of claim 9, wherein the first and second marker information are selectively introduced into the data flow to ensure that integrity of the data flow is maintained when a link aggregation for the at least some of the plurality of switch modules is modified.

13. The method of claim 9, wherein the statistics are based at least in part on port traffic.

14. The method of claim 9, wherein controlling the data flow by aggregating at least some of the plurality of switch modules comprises aggregating a plurality of local ports on one of the plurality of switch modules.

15. The method of claim 9, further comprising using the statistics for load-balancing purposes.

16. The stacked switch of claim 1, further comprising one or more redundant connections.

17. The stacked switch of claim 1, wherein the stacked switch has a plurality of Internet Protocol addresses while appearing as a single level three (L3) switch.

18. The stacked switch of claim 1, wherein the PDU marker frame is provided to the port of the plurality of ports having the highest priority level following removal of the plurality of marker frames from the data flow.

* * * * *